(12) United States Patent
Saumweber et al.

(10) Patent No.: US 9,605,586 B2
(45) Date of Patent: Mar. 28, 2017

(54) INTAKE PIPE FOR AN INTERNAL COMBUSTION ENGINE

(75) Inventors: Christian Saumweber, Stuttgart (DE); Viorel Braic, Stuttgart (DE); Mark Schienemann, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 443 days.

(21) Appl. No.: 13/476,338

(22) Filed: May 21, 2012

(65) Prior Publication Data

US 2012/0292002 A1    Nov. 22, 2012

Related U.S. Application Data

(63) Continuation of application No. PCT/EP2010/067864, filed on Nov. 19, 2010.

(30) Foreign Application Priority Data

Nov. 20, 2009   (DE) .................. 10 2009 053 884

(51) Int. Cl.
*F02B 29/04* (2006.01)
*F28D 7/16* (2006.01)
*F28F 9/00* (2006.01)

(52) U.S. Cl.
CPC ...... *F02B 29/0462* (2013.01); *F02B 29/0475* (2013.01); *F28D 7/1684* (2013.01); *F28F 9/00* (2013.01); *F02B 29/04* (2013.01); *Y02T 10/146* (2013.01)

(58) Field of Classification Search
CPC ... F02B 29/04; F02B 29/0462; F02B 29/0475

USPC ............................. 165/157, 42, 43
See application file for complete search history.

(56) References Cited

U.S. PATENT DOCUMENTS

| | | | | |
|---|---|---|---|---|
| 6,116,026 | A * | 9/2000 | Freese, V ................. | 60/605.2 |
| 6,634,420 | B2 * | 10/2003 | Gokan et al. ............. | 165/157 |
| 6,976,479 | B1 * | 12/2005 | Gottemoller et al. ..... | 123/559.1 |
| 2006/0048759 | A1 * | 3/2006 | Hendrix et al. ........... | 123/563 |
| 2006/0201663 | A1 * | 9/2006 | Strahle et al. ............ | 165/164 |
| 2006/0219394 | A1 * | 10/2006 | Martin et al. ............. | 165/157 |
| 2007/0017661 | A1 * | 1/2007 | Geskes et al. ............ | 165/166 |
| 2008/0223562 | A1 * | 9/2008 | Braic et al. ............... | 165/158 |
| 2008/0251242 | A1 * | 10/2008 | Irmler et al. .............. | 165/164 |

(Continued)

FOREIGN PATENT DOCUMENTS

DE    10 2004 025 187 B3    11/2005
DE    10 2006 043 526 A1    4/2007

(Continued)

*Primary Examiner* — Jianying Atkisson
*Assistant Examiner* — Joel Attey
(74) *Attorney, Agent, or Firm* — Muncy, Geissler, Olds & Lowe, P.C.

(57) ABSTRACT

An intake pipe for an internal combustion engine, comprising an outer housing of the intake pipe, wherein a feed line for charge air opens into an inlet section of the housing, a heat exchanger that is integrated in the intake pipe and cooled by a coolant and that comprises a plurality of exchanger tubes, in particular flat tubes, and an engine flange for connecting the intake tube to a cylinder head of an internal combustion engine, wherein charge air flows through the exchanger tubes and at least a section of the outer housing is designed as a water jacket surrounding the exchanger tubes.

13 Claims, 3 Drawing Sheets

(56) References Cited

U.S. PATENT DOCUMENTS

2008/0289804 A1* 11/2008 Baumann et al. ............ 165/157
2008/0289833 A1* 11/2008 Schienemann et al. ........ 169/51
2009/0056922 A1* 3/2009 Hemminger et al. ........ 165/158

FOREIGN PATENT DOCUMENTS

| | | | |
|---|---|---|---|
| DE | 10 2007 030 464 A1 | 1/2009 | |
| EP | 0 149 466 A2 | 7/1985 | |
| EP | 0149466 * | 7/1985 | .......... F02B 29/0462 |
| EP | 1 010 889 A2 | 6/2000 | |
| EP | 1 707 911 A1 | 10/2006 | |
| FR | 2 908 833 A1 | 5/2008 | |
| FR | 2908833 * | 5/2008 | .......... F02B 29/0418 |
| FR | 2 921 123 | 3/2009 | |

* cited by examiner

INTAKE PIPE FOR AN INTERNAL COMBUSTION ENGINE

This nonprovisional application is a continuation of International Application No. PCT/EP2010/067864, which was filed on Nov. 19, 2010, and which claims priority to German Patent Application No. DE 10 2009 053 884.4, which was filed in Germany on Nov. 20, 2009, and which are both herein incorporated by reference.

BACKGROUND OF THE INVENTION

Field of the Invention

The invention relates to an intake pipe for an internal combustion engine.

Description of the Background Art

It is known from practical experience in vehicle construction to make charge air coolers for cooling a condensed gas, supplied to the internal combustion engine, as indirect coolers, in other words, as a heat exchanger through which a cooling fluid flows such as, for instance, the coolant of the internal combustion engine. It is known to dispose such a heat exchanger integrated into an intake pipe of the internal combustion engine. In this type of construction, the heat exchanger may have a stack of flat tubes through which coolant flows, whereby it is inserted through an opening into an intake tube housing and attached to the housing by means of a flange plate. The charge air then flows around the coolant-carrying flat tubes and is cooled in this way.

SUMMARY OF THE INVENTION

It is therefore an object of the invention to provide an intake pipe for an internal combustion engine, with a design integrated in a charge air cooler with especially good mechanical stability.

An especially simple and effective option for a mechanically stable, pressure-resistant, and vibration-resistant design of the heat exchanger in the intake pipe result as the outer housing of the intake tube is designed at least partially as the water jacket surrounding the exchanger tubes and the charge air flows through the exchanger tubes and not around them as in the state of the art. At the same time, such an arrangement can be produced simply, reliably in regard to process, and cost-effectively.

Charge air within the meaning of the invention is generally understood to be not only compressed air but also a mixture of air and recirculated exhaust gas.

Basically, a device of the invention can be combined with any known type of exhaust gas recirculation, particularly low-pressure exhaust gas recirculation and high-pressure exhaust gas recirculation. The feeding-in of the recirculated exhaust gas can occur according to requirements upstream, downstream, or directly in the area of the heat exchanger.

In an embodiment of the invention, each of the exchanger tubes leads at the end into the bottoms of the heat exchanger, which makes possible a reliable and fluid-tight fastening.

It is provided with general preference that the water jacket is soldered in sections in a planar manner to the exchanger tubes. A heat exchanger construction that is mechanically highly stable and simultaneously cost-effective to produce is provided by this direct material bonding connection of the water jacket or housing part of the intake pipe to the exchanger tubes through which air flows and around which fluid flows. The planar soldering can occur particularly with the flattened narrow sides of the exchanger tubes formed as flat tubes. In a preferred but not necessary detail design, in this regard, a cooling fluid-side header is designed as a water jacket bulge, extending over a number of exchanger tubes, whereby preferably a cooling fluid connection is provided at the bulge. As a result, additional parts for a cooling fluid header are eliminated, whereby the bulge can be produced by simple deformation of a metal sheet.

In an embodiment, the water jacket comprises at least two sheet metal parts. In a preferred detail design, in this case, at least one of the sheet metal parts can have a base, running along a stack direction of the exchanger tubes, and two legs perpendicular thereto, whereby the legs are each soldered to a broad side of an outer exchanger tube. As a result, an especially simple and mechanically stable construction is provided.

It is generally advantageous to produce the heat exchanger of the inventive intake pipe as a unit of exchanger tubes, water jacket, and bottoms, said unit being soldered together in a soldering furnace. To this end, reference is made to the preferred exemplary embodiments of the invention. According to requirements, a multi-row arrangement of exchanger tubes in a depth direction can also be provided and the parts of the water jacket can be formed at least partially U-shaped.

A water jacket of the heat exchanger of the inventive intake pipe can be made up of two, three, or four individual components.

In an embodiment of the invention, at least one, either inlet section or engine flange, is fastened to the heat exchanger by means of form-fitting mechanical fastening, preferably by means of a corrugated slot crimping and/or a screw connection. Said mechanical fastening enables in particular the formation of the particular component of plastic. Variants are also possible in which an inlet section or engine flange, made of metal, is attached by means of mechanical fastening such as, for example, corrugated slot crimping or a screw connection.

In an alternative embodiment, at least one, either inlet section or engine flange, is connected by material bonding to the heat exchanger, preferably by means of welding and/or soldering. In the case of welding or soldering, the component in question may be formed of metal, for example, as a sheet metal part or as a cast part. This type of realization can provide that the metallic inlet section and/or engine flange are bundled together with the heat exchanger and soldered in a soldering furnace. Alternatively, however, soldering or welding can also occur after production of the heat exchanger in the soldering furnace.

Very generally, it can be provided according to requirements that at least one of two, either inlet section or engine flange, formed of plastic or also of metal, for example, aluminum. In particular, a combination form is possible in which, for example, the inlet section formed of plastic and the engine flange of metal or vice versa. This can depend in particular on whether an option for introducing recirculated exhaust gas is provided at one of the components, whereby construction of metal can make other measures for changing local overheating unnecessary in a simple manner.

In an embodiment of the invention, the ratio between a heat exchanger width, measured transverse to an airflow direction or width direction, and a cylinder distance of the internal combustion engine is between 2.1 and 3.3. This applies especially preferably in combination with a four cylinder inline engine. Alternatively or in addition, it is provided that the ratio between a heat exchanger depth, measured transverse to an airflow direction or depth direction, and a cylinder bore diameter of the internal combustion engine is between 0.95 and 1.4. Alternatively or in addition further, the ratio between a heat exchanger height, measured in the airflow direction or the height direction, and the product of the compression ratio and piston stroke of the internal combustion engine is preferably between 0.065 and 0.095. Each of the previously proposed preferred ranges of the relation between the engine dimensions and heat exchanger dimensions is a thermodynamically optimized variant. Especially preferably in this regard, a number or all of the variants are present in combination.

In another embodiment of the invention, the cooling fluid flows around the tubes predominantly in the counterflow direction relative to the charge air, as a result of which a thermodynamically especially effective and uniform cooling is achieved.

In an optimized embodiment, the exchanger tubes, formed as flat tubes, have a diameter D of about 6 mm to about 10 mm, a transverse pitch Q being especially preferably between 8 mm and 12 mm. The term transverse pitch is understood here to be the repeat length of a flat tube and a following gap or fin. Overall, good cooling with an especially low pressure drop can be achieved thereby.

In an embodiment of the invention, a connecting member for exhaust gas recirculation is formed at the engine flange. In this regard, this can be, for example, a high-pressure exhaust gas recirculation, whereby the engine flange is formed preferably as a cast aluminum part.

It is provided with general preference to optimize the installation space and to minimize the pressure drop that an inclination angle between the longitudinal axis of the flat tubes and a connection plane of the cylinder head of the internal combustion engine is between 70° and 90° for both main axes of the flat tube cross section.

Thermodynamically advantageous geometries for a heat exchanger of the invention are characterized by the following value ranges: Height h of the heat exchanger: 60 mm to 200 mm; Width b of the heat exchanger: 40 mm to 300 mm; Depth t of the heat exchanger: 30 mm to 170 mm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
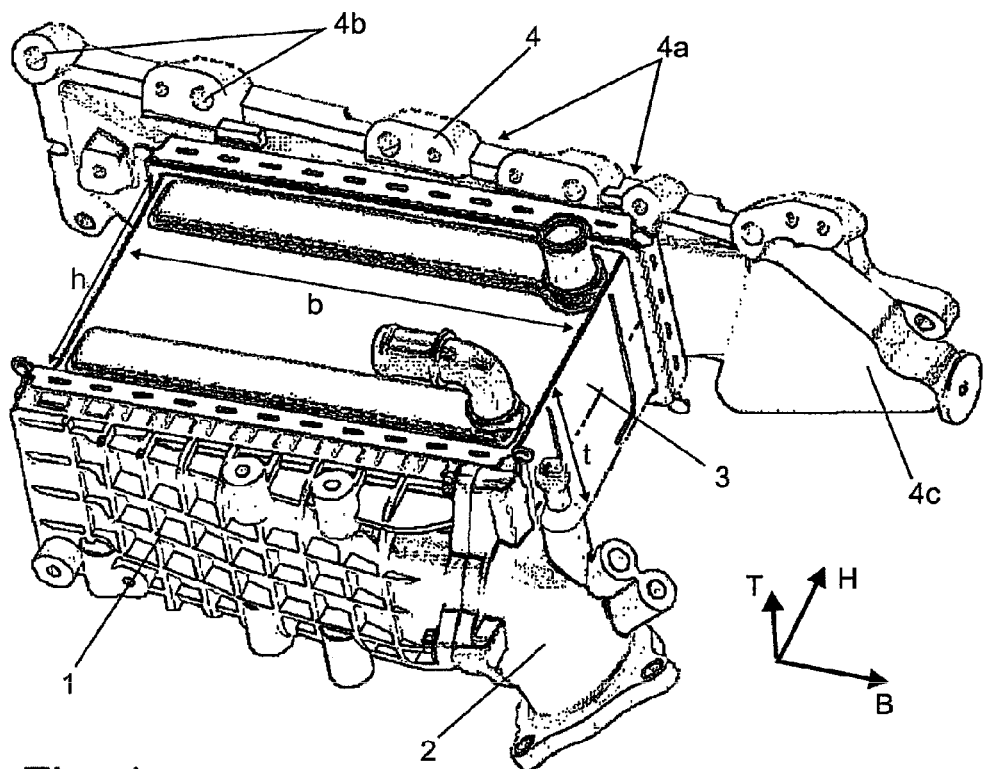
FIG. 1 shows an overall spatial view of an intake pipe of the invention.

The intake pipe shown in FIG. 1 comprises an inlet section 1, which is designed as a plastic injection-molded part. Inlet section 1 tapers in cross section in a width direction B of the intake pipe. A feed line 2 for supplying charge air is flange-mounted at a side end with a maximum cross section. Inlet section 1 substantially fulfills the function of an inlet-side header of a heat exchanger 3 adjacent to inlet section 1. The charge air flows through heat exchanger 3 in a height direction H, whereby the charge air heat is released to a cooling fluid in the form a liquid coolant.

The terms of height direction H, width direction B, and depth direction T, as defined in FIG. 1, are adopted as conventional terminology in heat exchanger construction in regard to the orientation of exchanger tubes 5. Orientation of the installation position of heat exchanger 3 relative to gravity is not correlated with these terms.

An engine flange 4 is arranged on the outlet side of heat exchanger 3, through which the charge air flows in the height direction H, and is directly flange-mounted on a cylinder head (not shown) of an internal combustion engine. In the present case, the fastening occurs by means of sealing surfaces 4a and mounting holes 4b. The through-flow cross section of the engine flange expands in the charge air flow direction from the outlet of the heat exchanger to the cylinder head connection plane.

Engine flange 4 in the present case is designed as a pressure cast aluminum part. It comprises in a side region a connecting member 4c for a high-pressure exhaust gas recirculation.

Figure 2:
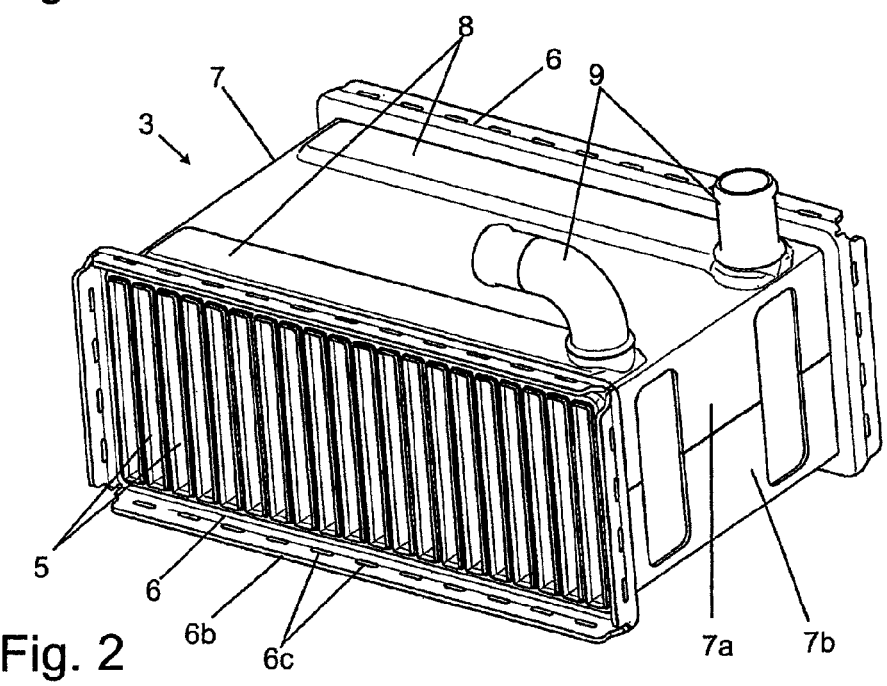
FIG. 2 shows a spatial view of a heat exchanger of the intake pipe of FIG. 1.
Figure 3:
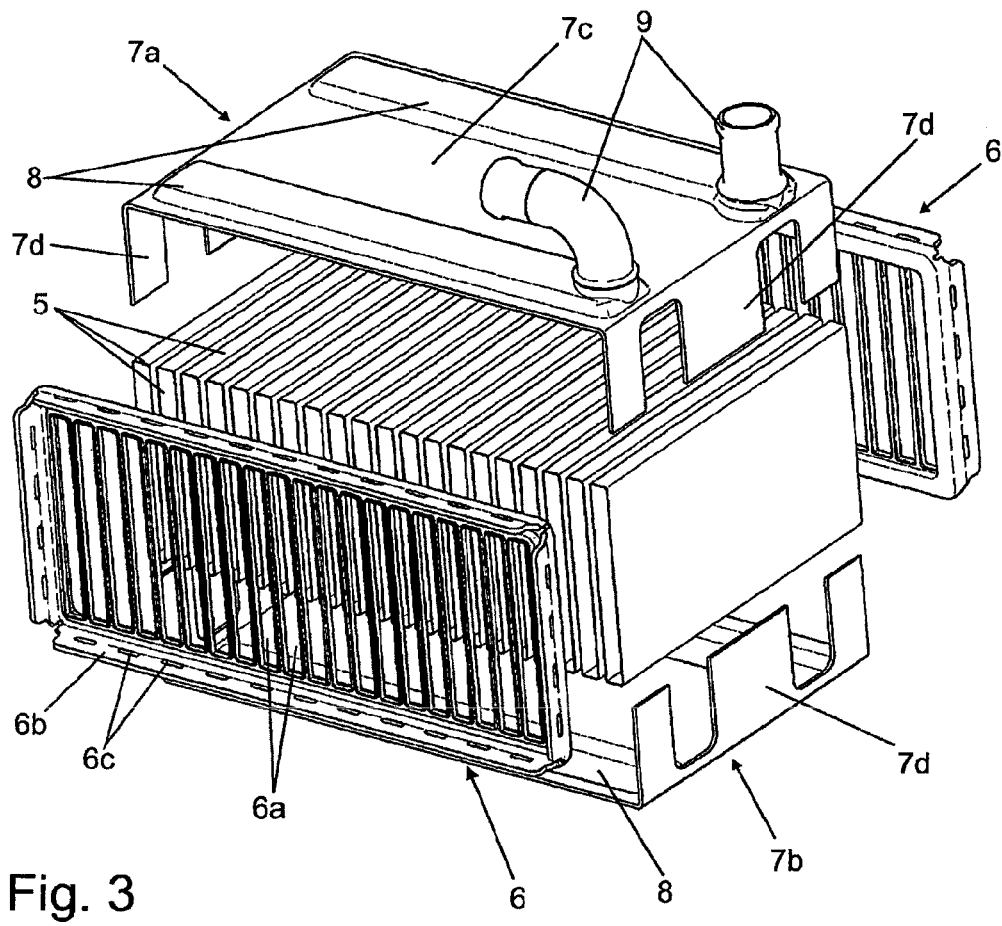
FIG. 3 shows an exploded illustration of the heat exchanger of FIG. 2.

Heat exchanger 3 is shown in detail in FIG. 2 and in an exploded view according to FIG. 3. It comprises a plurality of exchanger tubes 5, stacked in the width direction B and formed as flat tubes. The broad sides of the flat tubes extend in the height direction H and depth direction T. The narrow sides of the flat tubes extend in the height direction H and width direction B. Not shown are fins, which in each case are arranged between the broad sides of adjacent flat tubes 5 and are soldered to these in a planar manner.

Flat tubes 5 in the present case are made as flat tubes folded from metal sheets and produced in a known manner. They can be formed alternatively also as extruded profiles. According to requirements, flat tubes 5 may have inward and/or outward impressions to generate turbulences and/or to assure a defined distance of adjacent flat tubes during assembly. The interior of flat tubes 5 can be provided with fin sheets alternatively or in addition to such impressions.

Flat tubes 5 open at the end sides into passages 6a of a bottom 6. Bottoms 6 are made as sheet metal parts from an aluminum sheet. Bottoms 6 on the inlet and outlet side are identical in construction in the present case, as a result of which the number of different parts is reduced.

The stack of flat tubes 5 is surrounded by a water jacket 7, which has a first water jacket part 7a and a second water jacket part 7b. Water jacket 7 at the same time forms a part of the housing of the intake pipe of the invention, which is formed overall from inlet section 1, water jacket 7, and engine flange 4.

Both water jacket parts 7a, 7b have a base 7c with two angled legs 7d at the end side. The base 7c extends in each case along the width direction B transverse to the charge air flow direction and is soldered in a planar fashion to the narrow sides of exchanger tubes 5. Legs 7d in each case cover a part of a broad side of the outer flat tubes 5 of the stack and are soldered in a planar fashion with said broad side.

Water jacket parts 7a, 7b in the area of their bases 7c have in each case longitudinal bulges 8, which extend in the width direction B and function as a header for the liquid coolant flowing around flat tubes 5. Connections 9 are provided at bulges 8 of the one water jacket part 7*a* to supply and remove the coolant. Bulges 8 on the second water jacket part 7*b* improve the distribution of the cooling fluid, which flows overall substantially in the height direction H opposite to the charge air flow direction along the broad sides of flat tubes 5, therefore flows in the counterflow direction relative to the charge air. In an alternative embodiment, connections 9 can also be provided on different sides of the water jacket.

Bottoms 6 are mechanically premounted or bundled together with flat tubes 5 and water jacket parts 7*a*, 7*b* and soldered in a soldering furnace to form a heat exchanger block. To this end, suitable surfaces of the individual parts are plated with solder.

To connect inlet section 1 and engine flange 4, bottoms 6 have edges 6*b*, which are angled at 90° and provided with corrugated slotted crimping 6*c*. During the assembly of the intake pipe of the invention, corresponding structures are locked together form-fittingly on the sides of inlet section 1 and engine flange 4 with the corrugated slotted crimping 6*c*, so that a seal (not shown) is pressed sealingly between inlet flange 1 and engine flange 4, on the one hand, and the specific bottom 6, on the other.

In an alternative embodiment that is not shown, the mechanical fastening occurs by means of screwing inlet flange 1 and/or engine flange 4 to bottom 6.

When the specific part 1, 4 is made of metal, a material bonding fastening by means of welding or soldering, particularly soldering together with heat exchanger 3 in a soldering furnace, can be provided.

Figure 4:
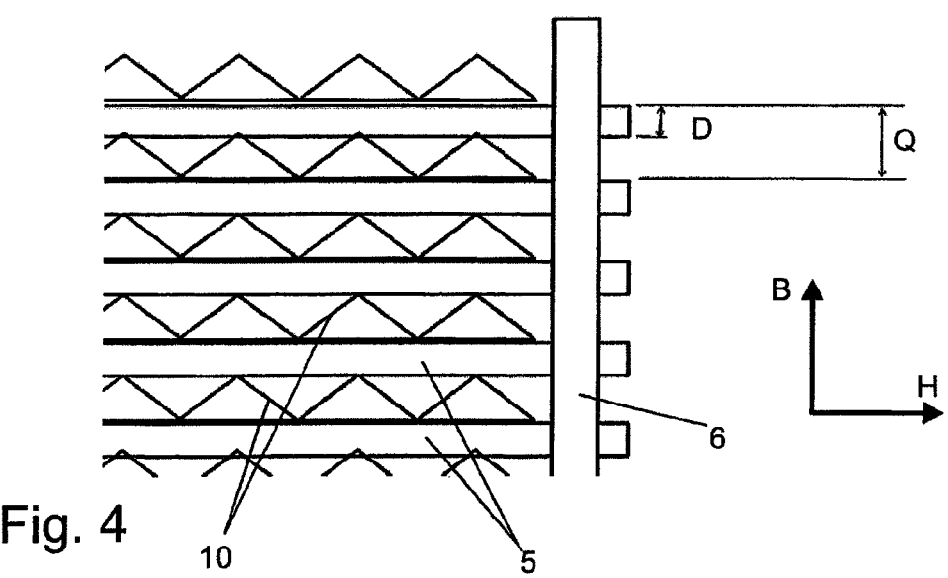
FIG. 4 shows a schematic sectional view of a stack of exchanger tubes of the heat exchanger of FIG. 2.

FIG. 4 shows a schematic sectional view which illustrates a dimensioning of the diameter D of flat tubes 5 and the transverse pitch Q defined as the repeat distance. A typical value for the tube diameter D is about 8 mm, whereby a typical transverse pitch Q is about 10 mm. The liquid-carrying interspace, shown not to scale in FIG. 4, between adjacent flat tubes 5 has a width of typically 2-3 mm. In the present case, said interspace is provided with fins 10, which assure improved transfer of the heat from the exchanger tube walls to the cooling fluid.

According to requirements for the pressure drop, fin inserts can also be provided in flat tubes 5. A fin density on the charge-air side for the exemplary embodiments of the invention is generally preferably between 50 and 100 fins per decimeter (fins/dm). If a low-pressure exhaust gas recirculation is present, the fin density is preferably between 60 and 90 fins/dm. If a high-pressure exhaust gas recirculation is present, the fin density is preferably between 40 and 60 fins/dm.

The dimensions of the heat exchanger in the shown exemplary embodiment are about 130 mm for the height h in the height direction H, about 210 mm for the width b in the width direction B, and about 80 mm for the depth t in the depth direction T.

Figure 5:
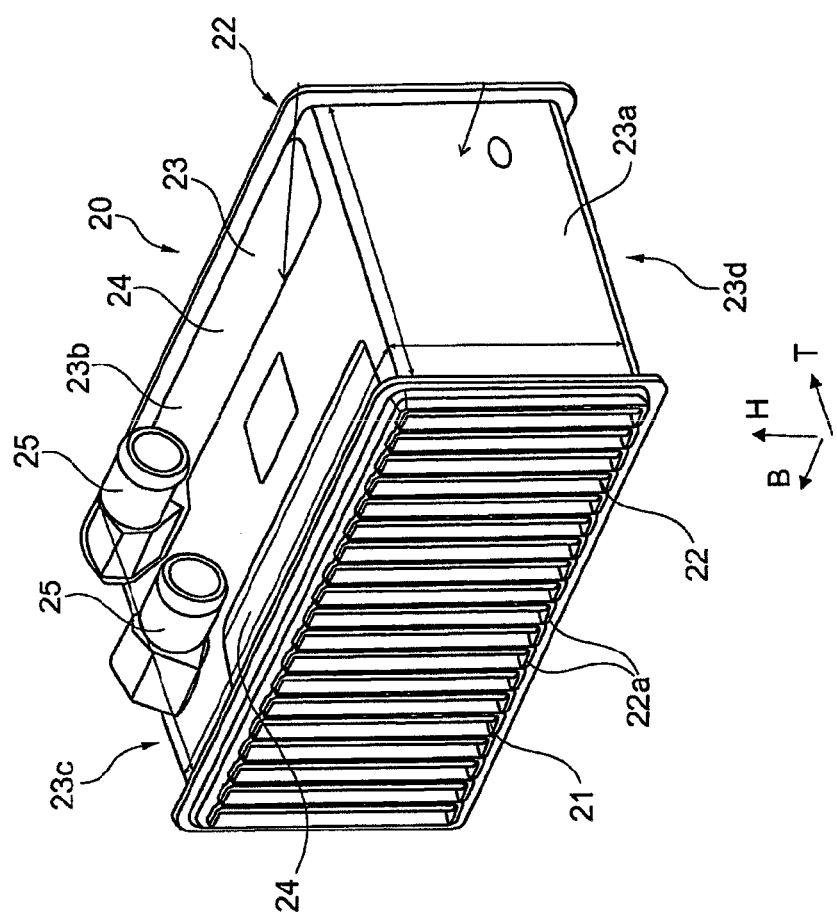
FIG. 5 shows a spatial view of another exemplary embodiment of a heat exchanger of the intake pipe.

FIG. 5 shows a heat exchanger 20, which is similar to the heat exchanger in FIG. 2. It comprises a plurality of exchanger tubes 21, which are stacked in the width direction B and are advantageously formed as flat tubes. The broad sides of the flat tubes extend in the height direction H and depth direction T. The narrow sides of the flat tubes extend in the height direction H and width direction B. Not shown are fins, which in each case are arranged between the broad sides of adjacent flat tubes 21 and are soldered to these in a planar manner. Optionally, the fins can also be omitted in another exemplary embodiment. In this regard, the tubes may have, for example, nubs on the outer side and/or on the inner side to increase the turbulence.

Flat tubes 21 in the present case are shaped as flat tubes folded from metal sheets and produced in a known manner. Alternatively, they can also be designed as extruded profiles. According to requirements, flat tubes 21 may have inward and/or outward impressions to generate turbulences and/or to assure a defined distance of adjacent flat tubes during assembly. The interior of flat tubes 21 can be provided with fin sheets alternatively or in addition to such impressions.

Flat tubes 21 lead at the end sides into passages 22*a* of a bottom 22. Bottoms 22 are made as sheet metal parts from an aluminum sheet. Bottoms 22 on the inlet and outlet side are identical in construction in the present case, as a result of which the number of different parts is reduced.

The stack of flat tubes 21 is surrounded by a water jacket 23, which has a first water jacket part 23*a*, a second water jacket part 23*b*, a third water jacket part 23*c*, and a fourth water jacket part 23*d*. Water jacket 23 at the same time forms part of the housing of the intake pipe of the invention, which is formed overall from the inlet section, water jacket 23, and the engine flange.

The four water jacket parts 23*a*, 23*b*, 23*c*, and 23*d* are each arranged on a side surface of the water jacket and thereby form a rectangular channel, in which the flat tubes run. In so doing, advantageously two opposite parts can be angled at the corners, so that the two remaining parts come to rest against these angled areas, so that improved soldering can be assured.

Water jacket parts 23*b*, 23*d* in the area of their bases each have longitudinal bulges 24, which extend in the width direction B and function as a header for the liquid coolant flowing around flat tubes 21. Connections 25 are provided at bulges 24 of the one water jacket part 23*b* to supply and remove the coolant. Bulges 24 on the second water jacket part 23*d* improve the distribution of the cooling fluid, which flows overall substantially in the height direction H opposite to the flow direction of the charge air along the broad sides of flat tubes 21, therefore flows in the counterflow direction relative to the charge air. In alternative embodiments, connections 25 can also be provided on different sides of the water jacket.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An intake pipe for an internal combustion engine, the intake pipe comprising:
    an inlet section for charge air;
    a feed line for the charge air that opens into the inlet section;
    a heat exchanger integrated into the intake pipe and cooled by a cooling fluid, the heat exchanger having a plurality of exchanger tubes and a water jacket surrounding the plurality of exchanger tubes; and
    an engine flange for connecting the intake pipe to a cylinder head of an internal combustion engine,
    wherein the charge air flows through the exchanger tubes,
    wherein each end of the heat exchanger has a bottom cover attached thereto, each bottom cover having passages through which ends of the exchanger tubes are inserted,
    wherein the inlet section attaches to the water jacket of the heat exchanger via a first one of the bottom covers, and wherein the first one of the bottom covers is positioned entirely between the inlet section and the water jacket, such that the inlet section is directly connected entirely to one side of the first one of the bottom covers and the water jacket is directly connected entirely to a second opposing side of the first one of the bottom covers, wherein the engine flange attaches to the water jacket of the heat exchanger via a second one of the bottom covers, such that the second one of the bottom covers is positioned between the engine flange and the water jacket, wherein the engine flange directly contacts the second one of the bottom covers, and wherein the second one of the bottom covers is a linear plate member having the passages through which the ends of the exchanger tubes are inserted, the linear plate member including a peripheral edge extending perpendicularly therefrom, the peripheral edge having corrugated slots therein, such that the peripheral edge is crimped directly to the engine flange.

2. The intake pipe according to claim 1, wherein the water jacket is soldered in areas in a planar fashion to the exchanger tubes.

3. The intake pipe according to claim 1, wherein a cooling fluid-side header is formed as a bulge extending over a number of exchanger tubes of the water jacket, and wherein a cooling fluid connection is provided at the bulge.

4. The intake pipe according to claim 1, wherein the water jacket comprises at least two or also four sheet metal parts.

5. The intake pipe according to claim 4, wherein at least one of the sheet metal parts has a base running along a stack direction of the exchanger tubes and two legs perpendicular thereto, wherein the legs are each soldered to a broad side of an outer exchanger tube.

6. The intake pipe according to claim 1, wherein at least one, either inlet section or engine flange, is fastened to the heat exchanger by a form-fitting mechanical connection, a corrugated slot crimping, and/or a screw connection.

7. The intake pipe according to claim 1, wherein at least one, either inlet section or engine flange, is connected by material bonding to the heat exchanger by welding and/or soldering.

8. The intake pipe according to claim 1, wherein at least one, either inlet flange or engine flange is formed of plastic.

9. The intake pipe according to claim 1, wherein at least one, either inlet flange or engine flange, is formed of metal, particularly aluminum.

10. The intake pipe according to claim 1, wherein the cooling fluid flows around the exchanger tubes in a counterflow direction relative to the charge air.

11. The intake pipe according to claim 1, wherein the exchanger tubes formed as flat tubes have a diameter of about 6 mm to about 10 mm, and wherein a transverse pitch is between 8 mm and 12 mm.

12. The intake pipe according to claim 1, wherein a connecting member for exhaust gas recirculation is formed at the engine flange.

13. The intake pipe according to claim 1, wherein the plurality of exchanger tubes are flat tubes.

* * * * *